Jan. 14, 1936.   J. H. GRAY   2,027,728
VEHICLE WHEEL AND TIRE LOCK
Filed March 4, 1935
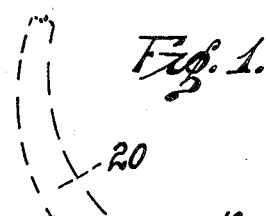
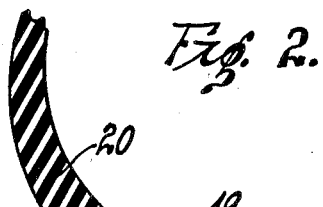

UNITED STATES PATENT OFFICE 2,027,728

VEHICLE WHEEL AND TIRE LOCK

James H. Gray, Long Beach, Calif.

Application March 4, 1935, Serial No. 9,228

5 Claims. (Cl. 70—90)

This invention relates to a novel wheel and tire lock for vehicles in which the tire, the rim and the wheel are all locked against removal, when my lock is in position and closed.

An object of my invention is to provide a lock of the character stated which can be readily applied to a vehicle wheel and which will effectively prevent the unauthorized removal of the tire, the rim or the wheel, and which can be quickly and easily detached when unlocked so that the owner can readily remove the wheel or tire, as desired.

Another object is to provide a lock of the character stated which will not unbalance the wheel when moving, which will not rattle, which will not get out of order easily, and which is so arranged that it will not strike against the curb, or the like, when the vehicle is being parked.

Another object is to provide a lock which can be applied either to wire or artillery type wheels, or wheels having fixed or detachable rims.

Other objects, advantages and features of invention may appear from the accompanying drawing, the subjoined detailed description, and the appended claims.

In the drawing

Figure 1 is a side elevation of my lock.

Figure 2 is a longitudinal sectional view of my lock in position on a wheel, only a fragment of the wheel being shown.

Figure 3 is a fragmentary side elevation—partly in section—of the base.

Referring more particularly to the drawing, the numeral 1 indicates the wheel rim, 2 the wheel hub and 3 the hub cap. It is to be understood that my lock can be applied either to wire or artillery type wheels but in the drawing, I have illustrated a wire wheel. In the modern wire wheel, the rim is attached to the hub by means of spokes and the rim is usually of the drop center type, i. e., there is no removable ring at the side of the rim. The wheel is attached to the driving hub by means of a plurality of bolts (not shown) and these bolts are exposed when the hub cap is removed. Therefore, in wire wheels, it is necessary to lock the hub cap against removal in order to prevent the entire wheel from being removed.

My lock 4 consists of a body 5 in which a cylinder lock 6 is mounted. A base 7 is detachably mounted on the bottom of the body 5 and a threaded stud 8 depends from the base. The stud may be cast in the base or may be integrally formed therewith, as desired. The stud screws thru the hub 2 and also thru the hub cap 3 substantially as shown in Fig. 2. It is immaterial whether the hub cap fits on the inside or the outside of the hub. A bail 9 is pivotally mounted on the body 5 and is adapted to fit under the lip 10 on the base 7. Thus, the base is tightly pressed against the body 5 and the parts are so arranged as to be locked together, as will be further described. The base 7 and body 5 are cut at an angle, as shown at 11, so that they will fit closely together without rattling and so that all of the parts will properly match.

The lock 6 is provided with a lock bolt 12 which is swung into a horizontal groove 13 in the base. The base is provided with a bore 14 into which the lower end of the lock 6 extends. A bore 15 is drilled or formed at one side of the body 5 and an upwardly extending pin 16 on the base 7 fits into the lower end of this bore thereby providing a further means of interconnecting the base and the body.

A rod 17 extends into the bore 15 and is both slidable and rotatable in the bore. A packing nut 18 encircles the rod 17 for the purpose of preventing any rattling when the lock is in use on a wheel. The rod is slidable in the bore 15 to allow for the natural movement in the spokes of the wheel and also for the purpose of releasing the lock, as will be further described.

A bolt 19 extends thru the wall of the casing 20 and thru the rim or felly of the wheel. The head of the bolt is on the inside of the casing and the threaded portion extends outwardly. A nut 21 screws onto the bolt 19, and the rod 17 is pivotally attached to the nut 21, as shown at 22. A cap 23 closes the upper end of the bore 14 and prevents dirt and moisture from entering the lock 6. This cap is held in position by a lug 24 which extends from the packing nut 18.

In operation, the base 7 is mounted on the wheel hub with the stud 8 screwed thru the hub and thru the hub cap. The nut 21 is screwed tightly upon the bolt 19 after which the body 5 and the base 7 are connected substantially as shown in the drawing. The body 5 can be moved vertically on the rod 17 to permit the lug 16 and the lock 6 to assume their proper positions. The key is then inserted in the lock and the bolt 12 is rotated into the slot 13, thus securely holding the parts together. It will be evident that the tire cannot be removed from the rim, nor can the wheel be removed from the vehicle, since all of these parts are locked together. The hub cap is also locked in position so that the wheel bolts cannot be reached.

Having described my invention, I claim:

1. In a wheel including a rim, a tire, a hub and a hub cap a wheel and tire lock comprising a body, a base removably mounted on the body, lock means securing the body and base together, a threaded stud depending from the base, said stud being being adapted and arranged to extend thru the wheel hub and hub cap, a rod extending from the body and mounted therein, means extending thru the tire and rim, and means on the rod removably attached to said last named means.

2. In a wheel including a rim, a tire, a hub and a hub cap a wheel and tire lock comprising a body, a base removably attached to the body, a lock in the body, said lock being adapted and arranged to secure the body and base together, a threaded stud depending from the base, said threaded stud screwing thru the wheel hub and hub cap, a rod extending from the body and mounted therein, a bolt extending thru the tire and rim, a nut screwed onto the bolt, said nut being attached to the rod.

3. In a wheel including a rim, a tire and a hub and a hub cap a wheel and tire lock comprising a body, a base, said body and base having aligned bores therein, a lock in the body, said lock being adapted to engage the base whereby the base is held on the body, said body having a second bore therein, a rod extending into the last named bore and extending from the body and mounted therein, a bolt extending thru the tire and wheel rim, a nut screwed onto the bolt, said nut being attached to the rod, and a threaded stud depending from the base adapted and arranged to screw thru the wheel hub and hub cap 4. In a wheel including a rim, a tire and a hub a tire and wheel lock comprising a body, a base removably attached to the body, lock means securing the body and base together, means on the base whereby it is removably attached to the hub of the wheel, a rod extending from the body and mounted therein, a bolt extending thru the tire and rim of the wheel, a nut threaded onto the bolt, said nut being attached to the rod.

5. In a wheel including a rim, a tire and a hub, a tire and wheel lock comprising a body, a base removably attached to the body, lock means securing the body and base together, a threaded stud depending from the base, said stud being screwed into the hub, a rod extending from the body and slidably mounted therein, a bolt extending thru the tire and rim of the wheel, a nut threaded onto the bolt, said nut being pivotally attached to the rod.

JAMES H. GRAY.